United States Patent [19]

Gelardi et al.

[11] Patent Number: 4,533,093
[45] Date of Patent: Aug. 6, 1985

[54] TAPE CASSETTE DUST DOOR SPRING ASSEMBLY AND METHOD FOR ASSEMBLING SAME

[75] Inventors: Paul J. Gelardi, Cape Porpoise; Robert B. MacLeod, Jr., Biddeford, both of Me.

[73] Assignee: Shape Inc., Biddeford, Me.

[21] Appl. No.: 556,545

[22] Filed: Nov. 30, 1983

[51] Int. Cl.³ .......................... G03B 1/04; G11B 15/32
[52] U.S. Cl. .................................... 242/197; 242/199; 206/387
[58] Field of Search .................. 242/197–200; 360/132, 137; 16/153, 76, 154, 186, 189, DIG. 10; 206/387, 389, 393, 403; 273/240; D22/5, 12

[56] References Cited

U.S. PATENT DOCUMENTS

| | | |
|---|---|---|
| 654,893 | 7/1900 | Hartshorn . |
| 776,892 | 12/1904 | Dahlund . |
| 2,747,876 | 5/1956 | Teller .................... 273/420 |
| 2,767,892 | 10/1956 | Darling .................. 137/527 |
| 3,809,219 | 5/1974 | Esahi .................. 220/55 K |
| 3,975,794 | 8/1976 | Kaiser et al. ............. 16/189 |
| 3,987,489 | 10/1976 | Schoettle et al. ......... 360/132 |
| 4,019,695 | 4/1977 | Wharam ................ 242/199 |
| 4,021,006 | 5/1977 | Morimoto et al. ........ 242/199 |
| 4,022,395 | 5/1977 | Kishi .................... 242/198 |
| 4,083,472 | 4/1978 | Wharam ................ 220/334 |
| 4,180,220 | 12/1979 | Shiba et al. ............. 242/199 |
| 4,358,070 | 11/1982 | Okamura et al. ........ 242/197 |

FOREIGN PATENT DOCUMENTS 1615734 6/1970 Fed. Rep. of Germany .
2204231 8/1973 Fed. Rep. of Germany .......... 16/76
230342 3/1925 United Kingdom .................... 16/76

OTHER PUBLICATIONS

IBM Technical Disclosure Bulletin, "Tape Cartridge", by R. B. Johnson and E. G. Nassimbene, vol. 9, No. 6, Nov. 1966.

*Primary Examiner*—Leonard D. Christian
*Attorney, Agent, or Firm*—Staas & Halsey

[57] ABSTRACT

A tape cassette dust door polar member, a dust door spring assembly and a related method for manufacturing and assembling the dust door spring assembly. The dust door polar member has a fixed end and a rounded free end. The rounded free end has a wide slit and a narrower slit extending therefrom toward the fixed end. The dust door spring assembly comprises this polar member and a spring having a short first leg and a long second leg angled relative to each other. The short first leg of the spring is positioned within the second slit of the polar member and the second leg of the spring is urged against the dust door to effect torsion of the spring. In the method of assembly, the wide and narrow slits of the dust door polar member sequentially receive the first short leg of the spring and twist the spring in a clockwise direction, to urge the second long leg against the dust door to effect torsion. This dust door polar member, dust door spring assembly and method for manufacturing and assembling the dust door spring assembly provide more efficient production and automated assembly of tape cassettes.

15 Claims, 6 Drawing Figures

TAPE CASSETTE DUST DOOR SPRING ASSEMBLY AND METHOD FOR ASSEMBLING SAME

BACKGROUND OF THE INVENTION

This invention relates to a tape cassette, and more particularly to a spring assembly for a tape cassette dust door.

A tape cassette usually comprises, among other things, a pivoting, spring-loaded dust door. When the cassette is not being used, the dust door is spring urged in the "closed" position to protect the tape in the cassette. When the tape cassette is inserted into a tape player/recorder, the dust door is caused to move to the "open" position to expose the tape for operation of the tape player/recorder. Upon removal from the tape player/recorder, the dust door is again spring urged into its normal closed position.

For convenience in describing the prior art and the present invention, front indicates the area of the cassette which is inserted into the tape cassette player/recorder, top indicates the area of the cassette facing up and bottom indicates the area of the cassette facing down when the cassette is inserted into the tape cassette player/recorder and, of course, sides indicate the walls to the left and right of the front between the top and bottom.

An example of a prior art tape cassette dust door spring assembly is U.S. Pat. No. 4,180,220, issued to Shiba et al. As seen in FIGS. 1 and 2 herein, the Shiba et al. '220 patent discloses a cassette housing 10 having a dust door 12 pivotally connected at the sides thereof. Located on the dust door 12 is a polar member 14 having a fixed end 16 and a free end 18. This polar member 14 functions as one of the pivots for the dust door. A first slit 20 is formed at the free end 18 and a second slit 22, formed continuously with the first slit 20, extends toward the fixed end 16. Both slits 20 and 22 have a rectangular shape. The width of the first slit 20 located at the free end 18 of the polar member 14 is narrower than the width of the second slit 22.

A spring 24 having a short leg (not shown) and a long leg 28 must be "loaded" on the polar member 14 in order to effect torsion of the spring 24 and accordingly bias the dust door 12 normally in the closed position. In order to load the spring 24, the short leg of the coil spring 24 must first be inserted into the first, straight and narrow slit 20 and then must be pushed into the second, wider slit 22. Both slits 20 and 22 are not continuous through the polar member 14 (they open only to one side of the polar member 14) and are only as deep as the length of the short leg. Secondly, the long leg 28 must be separately manipulated to be positioned under the top wall 26 of the dust door 12 in order to create the torsion in the spring 24 necessary to normally urge the dust door 12 into the closed position. Finally, the dust door 12 with the spring 24 loaded thereon is positioned on the cassette housing 10, as is known in the art.

U.S. Pat. No. 4,358,070, issued to Okamura et al., also discloses a slitted polar member; however, only one slit having a constant width is taught and the slit is continuous through the polar member for receiving the short leg of the spring. Nevertheless, the Okamura '070 patent also requires a two-step assembly process similar to that described above, i.e., inserting the short leg of the spring into the polar member slit and separately orienting the long leg of the spring against the dust door to effect torsion.

Thus, two separate assembly steps are required for prior art dust door spring assemblies, i.e.: (1) insertion of the short leg of the spring into the slit(s) of the polar member; and (2) positioning the long leg of the spring under the top wall of the dust door to oppose the force of the short leg and effect torsion.

It can be seen that known prior art dust door spring assemblies continue to have manufacturing drawbacks because assembly thereof is time consuming and is not fully conducive to automation. None of the known prior art assemblies have the novel features of the invention disclosed herein for eliminating such manufacturing drawbacks.

SUMMARY OF THE INVENTION

Accordingly, it is an object of the present invention to provide a dust door polar member which allows loading of a spring between the polar member and the dust door in one step.

It is another object of the present invention to provide a dust door spring assembly comprising the combination of a polar member having various width slits, a spring having legs skew to each other, and a dust door which together can be quickly and efficiently manufactured and assembled by automation.

Finally, it is an object of the present invention to provide a method for manufacturing and assembling a dust door spring assembly comprising the steps of forming a coil spring, a polar member and a dust door, and inserting the spring into the polar member at the same time the spring is loaded against the dust door.

To achieve the foregoing and other objects of the invention and in accordance with the purpose of the invention, there is provided a dust door polar member having a fixed end, a rounded free end, a wide slit at the free end, and a narrower slit continuous with the wide slit and extendng toward the fixed end.

There is also provided a dust door spring assembly, wherein the polar member described immediately above is combined with a dust door and a spring having a short leg and a long leg, the legs being skew to each other, wherein the narrow slit of the polar member receives in holding relation the short leg of the spring while the long leg of the spring is urged against the dust door wall to effect torsion of the spring.

Finally, there is provided a method for manufacturing and assembling a dust door spring assembly, wherein the polar member described immediately above is formed on the dust door, the spring described immediately above is formed, the small leg thereof is inserted sequentially into the wide and narrow slits of the polar member as the spring is twisted in the clockwise direction and the long leg of the spring is urged against the top wall of the dust door to effect torsion of the spring, all in one insertion step, thus resulting in facilitated automated assembly of the spring-biased dust door within a cassette housing.

Additional objects and advantages of the invention will be set forth in part in the description which follows, and, in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
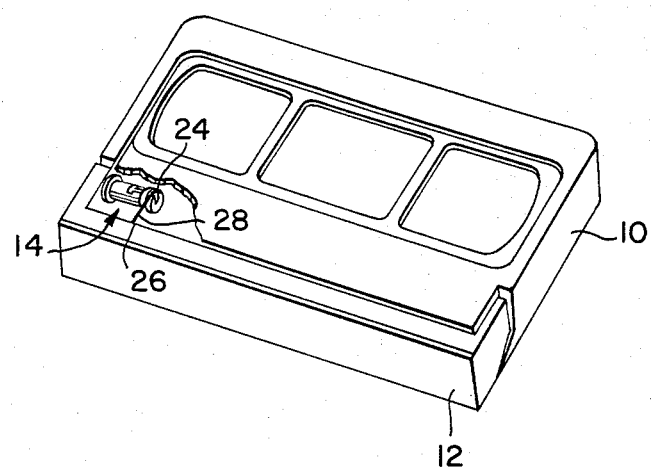
FIG. 1 is a perspective view of a prior art cassette housing, illustrating particularly a partial cut away view of the spring positioned between the the polar member and the cassette housing.
Figure 2:
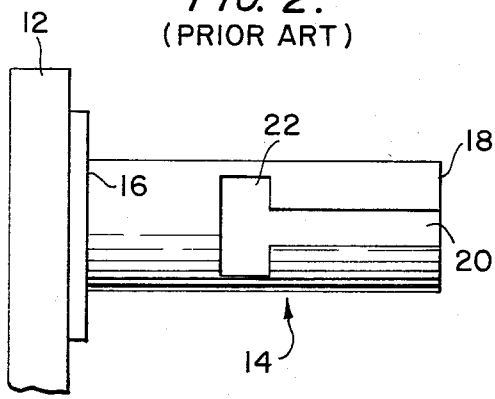
FIG. 2 is an enlarged top view of the polar member of the prior art when the dust door is closed, illustrating particularly the narrow slit at the free end of the polar member and the wider slit extending therefrom in the direction of the fixed end.

Of course, an example of the prior art dust door spring assembly upon which the present invention improves is illustrated in FIGS. 1 and 2 and was discussed previously. Nevertheless, FIGS. 1 and 2 will again be referred to herein when comparing the novel features of the present invention with the prior art.

Figure 3:
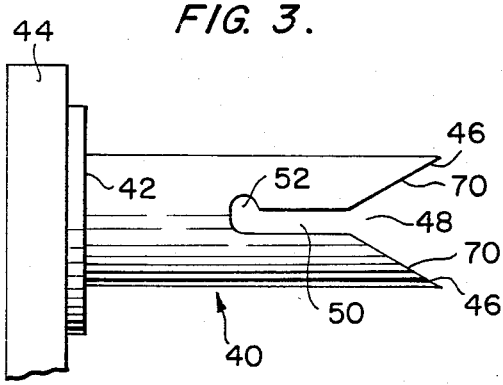
FIG. 3 is an enlarged top view of the polar member of the present invention when the dust door is closed, illustrating particularly the wider slit at the free end thereof and the narrower slit extending therefrom in the direction of the fixed end.

As seen in FIG. 3, the polar member 40 according to the present invention has an end 42 fixed to a dust door 44 and a free end 46. A first "lead-in" slit 48 is formed at the free end 46 and a second slit 50, formed continuously with the first slit 48, extends toward the fixed end 42. Both slits 48 and 50 are formed continuously through the polar member 40.

The fact that the slits 48 and 50 of the present invention are formed continuously through the polar member 40 (a manufacturing step different than forming the non-continuous slits 20 and 22 of the Shiba et al. '220 patent) is important for allowing the short leg 54 the necessary movement in the slits 48 and 50 during assembly, as will be discussed.

In contrast to the "slits" 20 and 22 of the prior art discussed above and shown in FIGS. 1 and 2, the width of the first slit 48 located at the free end 46 of the polar member 40 is wider than the width of the second slit 50 extending toward the fixed end 42. More particularly, the first slit 48 is preferably an opening extending the full width of the free end 46 and traversing approximately 60°. On the other hand, the second slit 50 is straight having sides which are coplanar with the longitudinal axis of the polar member 40. The sides of the second slit 50 are approximately 0.015 inch apart from each other. Preferably, the combined length of the first slit 48 and the second slit 50 is approximately 0.25 inch. Finally, a notch 52 is located in the second slit 50 for receiving the short leg 54 of the spring 56 upon assembly of the spring 56 onto the polar member 40, as will be discussed more fully hereafter.

Figure 4:
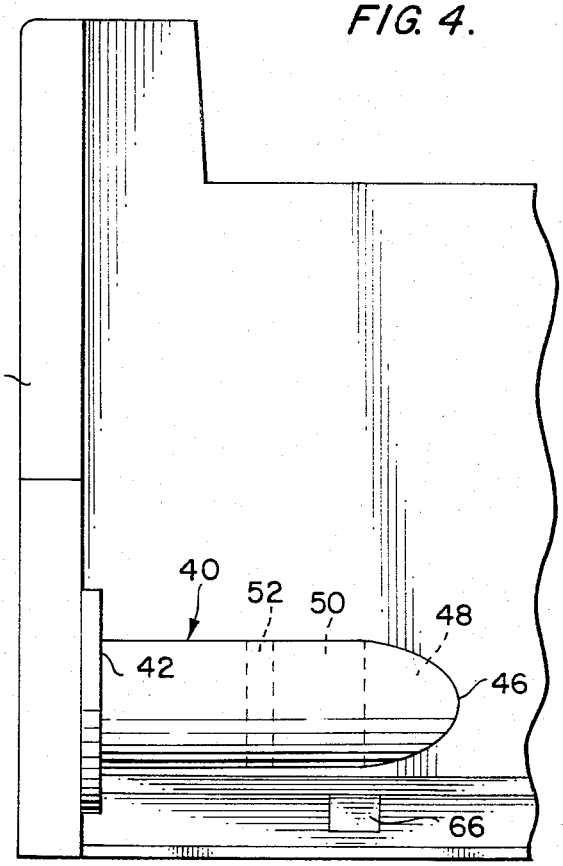
FIG. 4 is an enlarged, inverted front view of the polar member of the present invention when the dust door is closed, illustrating particularly the rounded free end of the polar member which in part is responsible for the one-step assembly of the dust door spring onto the polar member.

FIG. 4 illustrates that the free end 46 of the polar member 40 is rounded, which further facilitates assembly of the spring 56 onto the polar member 40, as will also be discussed more fully hereafter. In comparison to the prior art discussed above, the rounded free end 46, the first, wide slit 48, the second, narrow slit 50 and the notch 52 together function to more easily and dependably receive and guide the short leg of the spring into a fixed position in the polar member.

Figure 5:
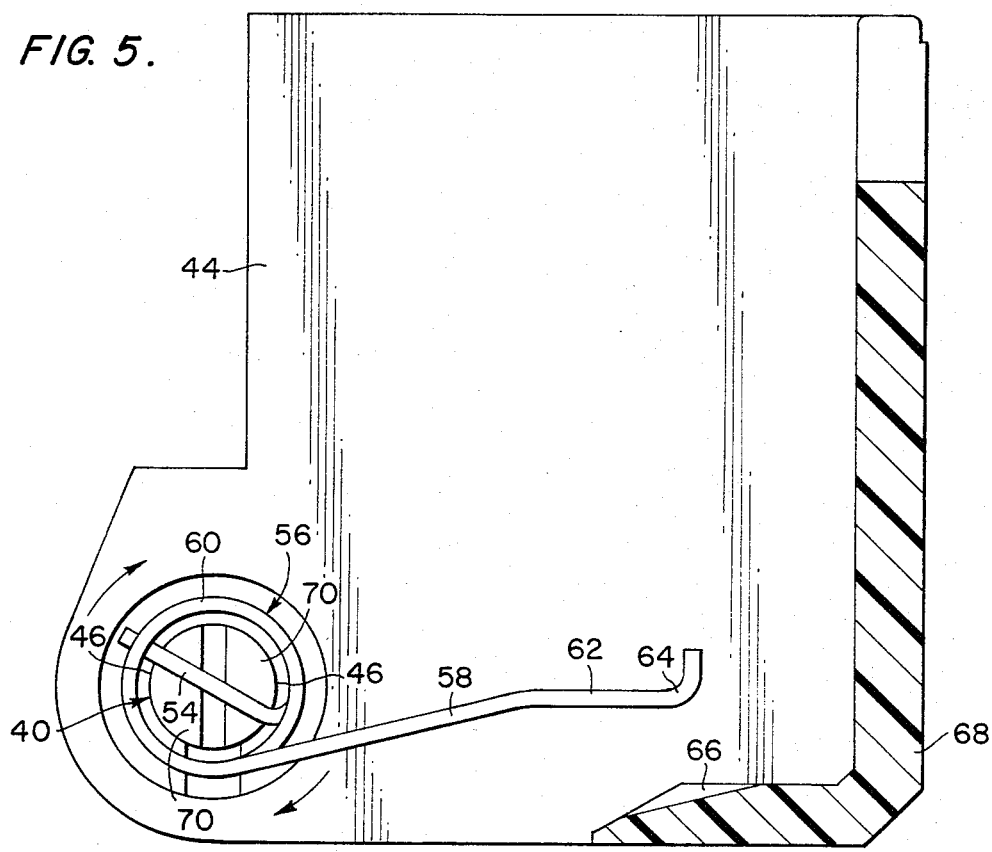
FIG. 5 is a right side inverted view of the dust door spring assembly of the present invention, illustrating particularly the spring in position ready for assembly on the polar member and the relationship of the long leg of the spring to the top wall of the dust door before assembly.
Figure 6:
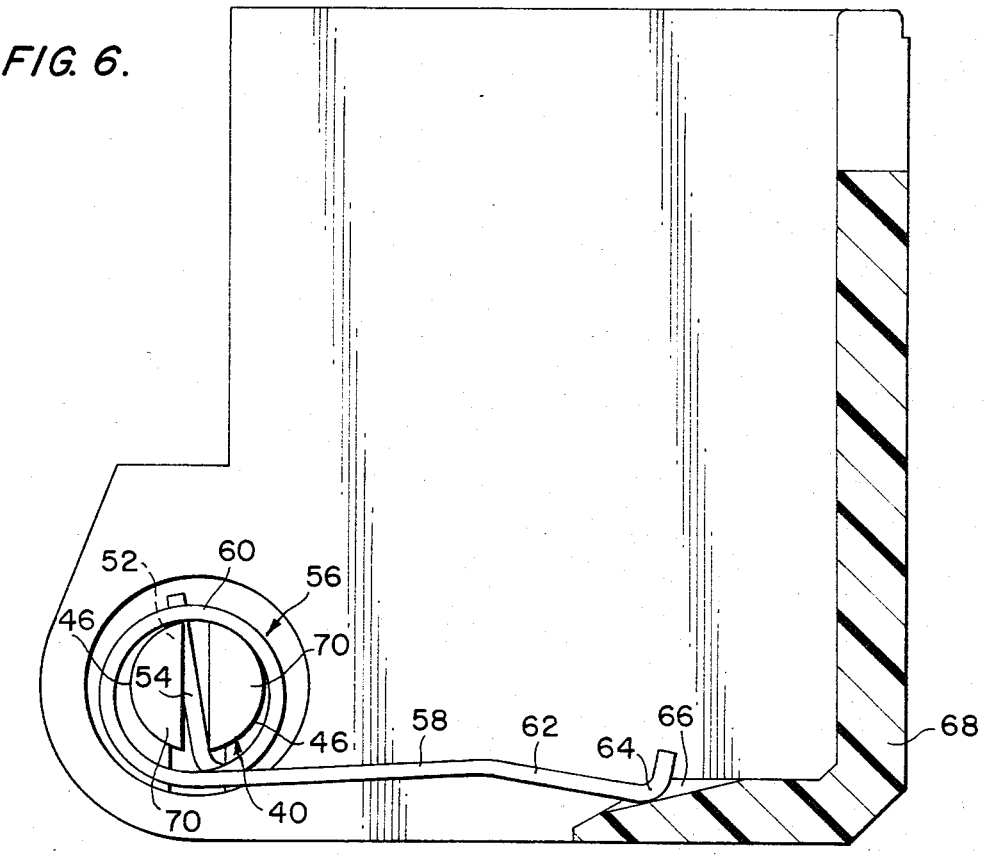
FIG. 6 is a right side inverted view of the dust door spring assembly of the present invention, illustrating particularly the spring assembled between the polar member and the dust door.

The dust door spring assembly of the present invention is shown in FIGS. 5 and 6.

FIG. 5 illustrates the spring 56 in position ready to be inserted onto the polar member 40. In addition to the short leg 54 discussed above, the spring 56 has a long leg 58 and a coiled body 60 between the short leg 54 and the long leg 58. The short leg 54 is slightly longer than the diameter of the coiled body 60 of the spring 56. The free end 62 of the long leg 58 is slightly angled at about 30° relative to the remainder of the long leg 58 and terminates in a hook 64. The slight angling of the end 62 of the long leg 58 facilitates positioning of the long leg 58 on the dust door 44 during assembly. The hook 64 at the end 62 of the long leg 58 prevents the metal edge from cutting into the dust door 44 by providing a smooth surface for sliding into the notch 66. In addition, the short leg 54 is angled, i.e., the legs 54 and 58 are skew to each other, and more particularly, imaginary lines passing through the legs 54 and 58, if in the same plane, would intersect preferably at an angle in the range of 120°–150°.

Finally, FIG. 5 illustrates a recess 66 formed in the top wall 68 of the dust door 44. This recess 66 receives the end 62 of the long leg 58 upon assembly of the spring 56 between the polar member 40 and the dust door 44, as will be discussed more fully hereinafter.

FIG. 6 illustrates the position of the spring 56 after being fully assembled on the polar member 40. When assembled, the short leg 54 of the spring 56 is held in the notch 52, the coiled body 60 of the spring 56 surrounds part of the polar member 40 and the end 62 of the long leg 58 of the spring 56 is urged against the top wall 68 of the dust door 44.

FIGS. 5 and 6 also illustrate the method for manufacturing and assembling the dust door spring assembly according to the present invention.

As stated briefly above, the short leg 54 of the spring 56 is first inserted into the first, wide slit 48 at the free end 46 of the polar member 40 until the short leg 54 abuts one of the two sloped walls 70 of the first wide slit 48. The rounded free end 46 and the walls 70 of the wide slit 48 facilitate orientation and insertion of the short leg 54 of the spring 56 into the first slit 48.

More particularly, when the spring 56 is being inserted into the first slit 46, an imaginary line running through the short leg 54 should be skew to an imaginary plane containing the longitudinal axis of the second slit 50. In addition, the long leg 58 should be positioned above and spaced from the top wall 68 of the dust door 44. The short leg 54 of the spring 56 is then pushed against the sloped walls 70 of the first slit 46, whereupon the short leg moves along the walls 70 and is directed centrally toward the second narrower slit 50, while being twisted, as is the entire spring 56, in a clockwise direction. That is, the sloped walls 70 of the first slit 48 direct the short leg 54 of the spring 56 to become coplanar with the second slit 50 and the short leg 54 can then enter the second slit 50. As the spring 56 twists in a clockwise direction, the long leg 58 necessarily is also being moved in a clockwise direction and eventually abuts the wall 70 of the dust door. Basically, the long leg 58 loads itself and does not require a separate step for assembly thereof as in the prior art.

Also, at the time the spring 56 is being pushed in the direction of the fixed end 42 of the polar member 40 and the short leg 54 of the spring 56 reaches the end of the second slit 50 nearest the fixed end 42, the short leg 54 enters and becomes lodged in notch 52. Once the short leg 54 is lodged in the notch 52, it is difficult for the short leg 54 to come out of the notch 52 during operation. In this position, the short leg 54 of the spring 56 is pushing against the notch 52 with a counter-clockwise force and the long leg 58 pushes against the wall 70 of the dust door 44 with a clockwise force. Of course, these forces exerted in opposite directions create the torsion necessary to normally urge the dust door into the closed position. Finally, once spring 56 is in the loaded position against the dust door 44, the dust door 44 is assembled on the cassette housing (not shown) with the long leg 58 of the spring 56 being urged against a wall in the front of the cassette housing to effect torsion. This final assembly step is known in the art.

As mentioned above, the slits 48 and 50 are preferably formed continuously through the polar member 40. If the slits 48 and 50 were not continuous, as is the case with Shiba et al. '220 patent, the short leg 54 of the spring 56 would have to be shortened further to fit into the non-continuous slits. In addition, a further modification to the short leg 54 would be required if non-continuous slits were used, i.e., the free end of the short leg 54 would have to be hooked or otherwise smoothed to prevent cutting into the walls of the slits as it is being twisted during insertion.

It can be seen from the above description that the present invention provides a dust door polar member facilitating insertion of a spring thereon, a dust door spring assembly efficiently and normally biasing the dust door in the closed position and a method of assembling the dust door spring assembly which allows for introduction of a spring onto the polar member at a particular angle, and as the spring is pushed onto the polar member it twists such that by the time the short leg of the spring becomes lodged at the notch in the second narrow slit the long leg of the spring is assembled onto the dust door already under tension, thus effecting more time and cost-efficient manufacture and automated production.

The above-described dust door polar member, dust door spring assembly and method for manufacturing and assembling the dust door spring assembly have been shown to be for the type of cassette intended for use in video tape recorders. However, the invention can be similarly applied to tape cassettes for use in audio or other recording and/or reproducing apparatus.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention and the appended claims and their equivalents.

We claim:

1. A spring assembly for a tape cassette dust door, comprising:
   (a) a polar member with a first end fixed to the dust door and a second free end, the second free end being rounded and having formed therein a first slit and a second relatively narrower slit extending from the first slit toward the first, fixed end of the polar member and the polar member being fixed substantially perpendicular to a surface of the dust door; and
   (b) a spring having a first leg, a coiled body and a second leg, the first leg being received by the second slit of the polar member, the body surrounding the polar member and the second leg of the spring being urged against the dust door, wherein the spring is held in torsion relationship.

2. The spring assembly as recited in claim 1, wherein the first slit of the polar member is an angled opening extending the full width of the second free end and traverses approximately 60°.

3. The spring assembly as recited in claim 2, wherein the second slit of the polar member is formed continuously through the polar member, is relatively straight and has sides which are coplanar with the longitudinal axis of the polar member.

4. The spring assembly as recited in claim 1, wherein imaginary lines passing through the first and second legs of the spring are skew to each other.

5. The spring assembly as recited in claim 4, wherein the second leg of the spring is longer than the first leg.

6. The spring assembly as recited in claim 5, wherein imaginary lines passing through the first and second legs of the spring intersect at an angle in the range of 120°–150°.

7. The spring assembly as recited in claim 1, wherein the second slit of the polar member further comprises a notch for receiving in holding relation the first leg of the spring.

8. A method of manufacturing and assembling a spring assembly for a dust door of a tape cassette housing, comprising the steps of:
   (a) forming a polar member with a first end fixed to the dust door and a second free end, the second free end having formed therein a first slit and a second relatively narrower slit extending from the first slit toward the first fixed end of the polar member;
   (b) forming a spring having first and second legs; and
   (c) inserting the first leg of the spring into the first slit of the polar member causing twisting of the spring and aligning of the first leg of the spring with the second slit of the polar member such that the first leg moves into the second slit and the second leg of the spring moves into abutting relation with the dust door.

9. The method as recited in claim 8, wherein the first slit of the polar member is an angled opening extending the full width of the second free end and traverses approximately 60°.

10. The method as recited in claim 9, wherein the second slit of the polar member is relatively straight and has sides which are coplanar with the longitudinal axis of the polar member.

11. The method as recited in claim 8, wherein imaginary lines passing through the first and second legs of the spring are skew to each other.

12. The method as recited in claim 11, wherein the second leg of the spring is longer than the first leg.

13. The method as recited in claim 12, wherein imaginary lines passing through the first and second legs of the spring intersect at an angle in the range of 120°–150°.

14. The method as recited in claim 8, wherein the free end of the polar member is rounded.

15. The method as recited in claim 8, wherein the second slit of the polar member further comprises a notch for receiving in holding relation the first leg of the spring.

* * * * *